United States Patent
Fletcher

(12) 
(10) Patent No.: US 6,557,043 B1
(45) Date of Patent: *Apr. 29, 2003

(54) COMMUNICATION OF STRUCTURED DOCUMENT CONTENT BETWEEN 3270 LOGICAL UNITS

(75) Inventor: James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,909

(22) Filed: Dec. 17, 1999

(51) Int. Cl.[7] ............................................. G06F 15/16
(52) U.S. Cl. ........................ 709/231; 709/219; 709/227
(58) Field of Search ................................. 709/230, 231, 709/219, 227

(56) References Cited

U.S. PATENT DOCUMENTS 6,216,164 B1 * 4/2001 Zaremba, Jr. ............... 709/227
6,252,591 B1 * 6/2001 Dockweiler et al. ........ 345/744
6,327,624 B1 * 12/2001 Mathewson et al. ........ 709/231
6,374,273 B1 * 4/2002 Webster ...................... 707/513
6,480,895 B1 * 11/2002 Gray et al. .................. 709/231

* cited by examiner

*Primary Examiner*—Mark Powell
*Assistant Examiner*—Douglas Blair
(74) *Attorney, Agent, or Firm*—Jeanine S. Ray-Yarletts; Marcia L. Doubet

(57) ABSTRACT

A method, system, and computer program product for communicating structured document content between legacy 3270 logical units. A 3270 data stream is sent between a primary logical unit (LU) and a secondary LU over a network using 3270 data stream architecture, with structured document content (such as content encoded in the Extensible Markup Language, or "XML") embedded therein. The sending of 3270 data stream communications and the sending of 3270 data stream structured fields are repeated in an arbitrary sequence, to thereby asynchronously send 3270 data streams and structured document content between the primary LU and the secondary LU. Thus, structured documents may be sent using the LU2 protocol in a manner that need not interfere with legacy communications between a 3270 application and an end user.

39 Claims, 14 Drawing Sheets

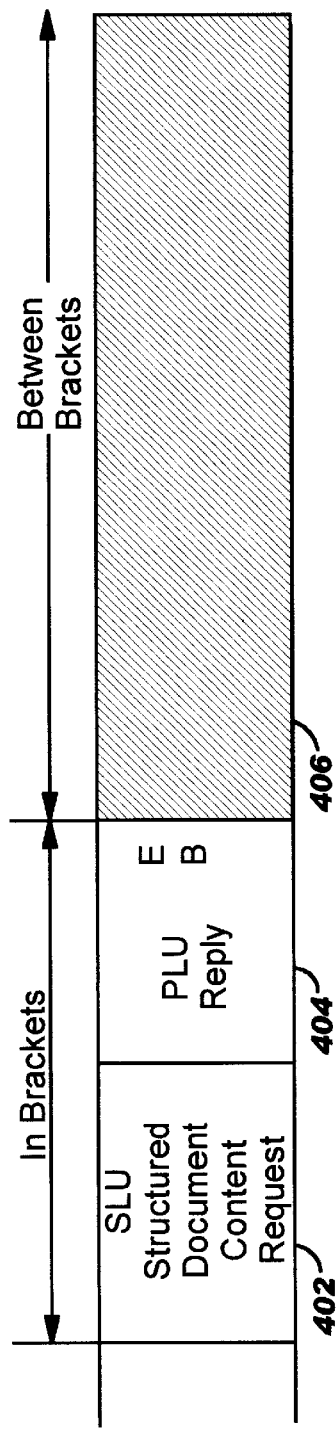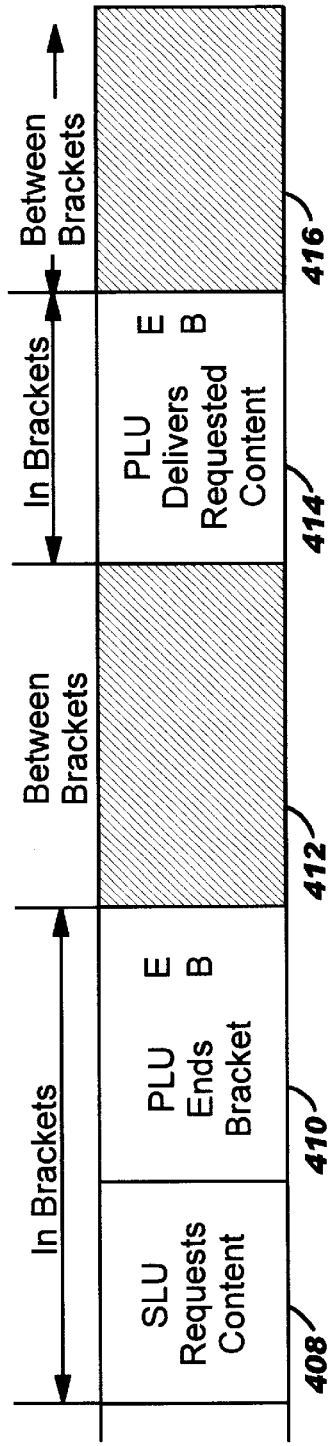
FIG. 4A
FIG. 4B

Start

↓

502 — PLU'S Application Passes Structured Document Content To PLU With A Reply-Expected Indicator

↓

504 — Wait Until Session Is Between Brackets, Or In Brackets And PLU Has Permission To Send

↓

506 — Embed Data In A Chain Of One Or More Request Units

↓

508 — Session In Brackets? — Yes →

↓ No

510 — Set Begin Brackets Indicator In RH Of First RU Of Chain Containing Embedded Structured Document Content

↓

512 — Expect Synchronous Reply? — No ↓ / Yes ↓

COMMUNICATION OF STRUCTURED DOCUMENT CONTENT BETWEEN 3270 LOGICAL UNITS

RELATED APPLICATION

This application is related to application Ser. No. 09/465,847, filed concurrently herewith, entitled "Integration of Structured Document Content With Legacy 3270 Applications", assigned to the assignee of the present invention, the disclosure of which is hereby incorporated herein by reference.

BACKGROUND OF THE INVENTION

1. Field of the Invention

This invention relates to the field of computer programming, and more particularly to a system, method, and computer program product for using the 3270 data stream architecture to communicate structured document content (such as content created in the Extensible Markup Language, or "XML").

2. Description of the Related Art

One of the challenges facing information services professionals today is the difficulty of bridging legacy mainframe host data to modern applications and their PC-based user interfaces. Most legacy host applications present their data in text-based user interfaces designed for use on specific, obsolete character-based terminals. The legacy applications were written with this character-based terminal presentation space as the only interface format in which the host data output is created, and in which host data input is expected. ("Presentation space" is a term used abstractly to refer to the collection of information that together comprises the information to be displayed on a screen, as well as the control data that conveys how and where that information is to represented.)

A typical character-based terminal is the IBM Model 3270. (IBM is a registered trademark of the International Business Machines Corporation.) This terminal model was designed to display information in a matrix of characters, where the matrix consisted of 24 rows each having 80 columns. When programs were written expecting this display format, programmers would specify placement of information on the screen using specific row and column locations. Information formatted for this display is sent as a "data stream" to the mechanism in the display hardware that is responsible for actually displaying the screen contents. The phrase "data stream" refers to the fact that the data is sent as a linear string, or stream, of characters. This stream of characters contains both the actual textual information to be displayed on the screen, as well as information specifying where and how the text is to be displayed. "Where" consists of the row and column where the text is to begin, and "how" consists of a limited number of presentation attributes such as what color to use when displaying that text, the color of the background, etc. While the Model 3270 is a specific type of IBM display hardware, data formatted for any display having similar characteristics became a de facto standard format referred to as a "3270 data stream".

Data processing systems, methods, and computer program products that use the 3270 data stream architecture have been widely used for decades. The 3270 data stream architecture has been so widely used that systems and applications using the 3270 data stream architecture are often referred to as "legacy" systems and "legacy" applications.

The 3270 data stream architecture is used to communicate between a primary logical unit and a secondary logical unit using the LU2 protocol. The primary and secondary logical units may be mainframe computers, midrange computers, personal computers, terminals, workstations, or one or more computer programs that execute on one or more of the these devices. The 3270 data stream architecture is described in many publications, including "IBM 3270 Information Display System Data stream Programmer's Reference", IBM Publication Number GA23-0059-06 (1981), which is hereby incorporated herein by reference.

As shown in FIG. 1, a data processing system 100 includes a primary logical unit 110 and a secondary logical unit 120 that communicate with each other over a network 130 using the 3270 data stream. The primary logical unit 110 may also be referred to as a host or server, and the secondary logical unit 120 may be referred to as a terminal, workstation, emulator, or client. As will be obvious to one of skill in the art, although FIG. 1 illustrates a simple data processing system 100 including one primary logical unit, one secondary logical unit 120, and a simple network connection 130, the 3270 data stream architecture is generally used to communicate among many primary logical units and secondary logical units using complex network environments. An example of a more typical data processing system using 3270 data stream architecture may be found in U.S. Pat. No. 5,649,101, entitled "System and Method for Improving 3270 Data Stream Performance by Reducing Transmission Traffic", the disclosure of which is hereby incorporated herein by reference.

The 3270 data stream architecture was designed well before many of the recent advances in computing, such as the definition of markup languages including XML for representing structured document content. XML is a standardized formatting notation, created for structured document interchange on the World Wide Web (hereinafter, "Web"). XML is a tag language, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to be treated as an e-mail address; the syntax "</email>" would then be inserted after the character string, to delimit where the e-mail character string ends.

The syntax of XML is extensible, providing users the capability to define their own tags. XML is based on the Standard Generalized Markup Language ("SGML"), which is an international standard for specifying document structure. XML is a simplified version of SGML, tailored to Web document content. (Refer to ISO 8879, "Standard Generalized Markup Language (SGML)", (1986) for more information on SGML. Refer to "Extensible Markup Language (XML), W3C Recommendation Feb. 10, 1998" which is available on the World Wide Web at http://www.w3.org/TR/1998/REC-xml-19980210, for more information on XML.)

XML is widely accepted in the computer industry for defining the semantics (that is, by specifying meaningful tags) and content of the data encoded in a file. The extensible, user-defined tags enable the user to easily define a data model, which may change from one file to another. When an application generates the tags (and corresponding data) for a file according to a particular data model and transmits that file to another application that also understands this data model, the XML notation functions as a conduit, enabling a smooth transfer of information from one application to the other. By parsing the tags of the data model from the received file, the receiving application can re-create the information for rendering (i.e. display, printing, or other processing, as the generating application intended it).

Other popular markup languages include the HyperText Markup Language ("HTML"), Wireless Application Protocol Binary XML ("WBXML"), MathML, and VoiceXML. Each of these languages is adapted for the needs of a particular environment. HTML, for example, is adapted for general use with documents in the Web environment, and WBXML is adapted for document presentation on wireless computing devices.

It is anticipated that the interchange of documents created using a markup language will continue to increase in popularity as distributed computing becomes more pervasive in society. It would be desirable to rewrite legacy applications to receive and deliver data using the structured format defined by these modern markup languages, in order to make the application's functionality available to users having a wide spectrum of computing device types. However, for most companies the rewrite of legacy applications represents a monumental task. Not only are there literally millions of lines of code to rewrite, but the skills that are required to program host applications (ability to use the COBOL programming language, for example) are in short supply. Furthermore, modification of existing legacy application software to change the data format used is very likely to introduce new errors, necessitating a significant testing and debugging effort.

Thus, it would be desirable to provide a technique for integrating structured document content with legacy 3270 applications to obtain the advantages of using the same existing conduit that transports the 3270 legacy data to transport the structured document content, and of using existing document processors which operate upon documents created in the various markup languages. These existing document processors include parsers and rendering software, which process a structured document for display or other presentation to a user; applications that have been written to process the content which can be extracted from a structured document; style sheet processors; etc. (A "style sheet" is a specification of a style that is to be used when presenting a document. The style specification includes information such as the font and margins to be used, the formatting layout, and other types of information that indicate how the presented document should appear. Style sheets can be used for many types of presentation of a document, including printing the document, displaying it on a video display, processing the document by a speech synthesizer, etc. Style sheets may also be utilized to describe transformations from one document type to another, e.g. from MathML to HTML, or as filters which describe transformations to reduce the amount of content while maintaining the original document type.)

Preferably, this integration of structured document content with legacy 3270 applications will not require rewriting or significantly modifying existing legacy applications.

Techniques exist that might be used for transforming legacy application data from the 3270 data stream into structured document content, for example by transforming the data stream with a specially-written transformation engine at the server on which the legacy application is executing, and then sending this transformed data to the application client. However, this approach fails to take advantage of the existing infrastructure for transporting 3270 data streams. Alternatively, the 3270 data stream can be transformed using a transformation engine at an intermediary point within the network such as a gateway. Both of these approaches suffer from the disadvantage that the existing client application software, written to process 3270 data streams, must then be replaced with application software written to process the structured document format. Furthermore, the latter approach introduces significant complexity in generating an appropriate 3270 data stream for forwarding client-generated messages back to the legacy application executing on the server—in effect, simply moving the problem from one location to another. While replacing the client software may be a desirable long-term goal, providing an integration of structured document content with existing 3270 data streams enables existing software to continue to function, but with potentially significant new value—and makes a phased-in approach to modifying the client software possible.

The 3270 data stream architecture communications between a primary logical unit ("PLU") and a secondary logical unit ("SLU") generally take place in a manner that is quite different from modem communications with which structured document content is typically transported (such as the HyperText Transfer Protocol, or "HTTP"). More specifically, communications between a PLU and an SLU take place using the LU2 protocol.

As is well known to those of skill in the art, the LU2 protocol is a half-duplex flip-flop (two-way alternating) protocol. A sender sets a Change Direction indicator when it has finished a transmission, and expects the next transmission to be from the receiver. Brackets delineate a series of Request/Response Units (RUs) that together provide a single transaction. Between brackets, either the PLU or the SLU may begin a new bracket. In the case of bracket contention, the SLU has priority. Only the PLU can end a bracket. Chaining allows multiple RUs to be sent in a group to the same LU. When a definite response or exception response is requested, a chain is the unit that the LU acknowledges or rejects. LU2 protocol is described in many publications, such as "IBM 3174 Establishment Controller Functional Description", IBM Publication No. GA23-0218-11 (1994), the disclosure of which is hereby incorporated herein by reference.

It would be desirable to pass structured document content between a PLU and an SLU that communicate with each other over an existing network using 3270 data stream architecture. Such communications should preferably take place asynchronously, and the communication of structured document content should not significantly impact conventional 3270 data stream communications.

SUMMARY OF THE INVENTION

It is therefore an object of the present invention to provide improved systems, methods, and computer program products for communicating structured document content between 3270 logical units.

It is another object of the present invention to allow asynchronous communication of structured document content between 3270 logical units.

It is still another object of the present invention to allow communication of structured document content between 3270 logical units without significantly impairing the ability of a legacy application and an end user to interact in a conventional manner.

To achieve the foregoing objects, and in accordance with the purpose of the invention as broadly described herein, the present invention provides a method, system, and computer program product for communicating structured document content between legacy 3270 logical units. A 3270 data stream is sent between a PLU and an SLU over a network using 3270 data stream architecture, with structured document content (such as content encoded in the Extensible Markup Language, or "XML") embedded therein. The sending of 3270 data stream communications and the sending of 3270 data stream structured fields may be repeated in an arbitrary sequence, to thereby asynchronously send 3270 data streams and structured document content between the primary LU and the secondary LU. Thus, structured documents may be sent using the LU2 protocol in a manner that need not interfere with legacy communications between a 3270 application and an end user.

According to the present invention, the PLU includes a first application and the SLU includes a second application. The structured document content is passed from the first application to the second application over a network using 3270 data stream architecture by sending structured document content from the first application to the corresponding PLU, and waiting until a 3270 communication session between the PLU and the SLU is between brackets, or is in brackets, and the PLU has permission to send. If the session is between brackets, a Begin Brackets request header is sent from the PLU to the SLU. At least one request unit is sent from the PLU to the SLU, where each request unit contains a 3270 data stream structured field with the structured document content embedded therein. The embedded structured document content is then sent from the SLU to the second application.

If a synchronous reply to the structured document content is expected, then an In Brackets indicator is sent in a last of the request units containing a 3270 data stream structured field with the structured document content embedded therein. A reply may be sent from the second application to the SLU. An In Brackets, Change Direction request header is sent from the SLU to the PLU. At least one request unit is sent from the SLU to the PLU, where each request unit contains a 3270 data stream structured field with the reply embedded therein. The embedded reply is sent from the PLU to the corresponding first application. Thus, structured document content may be passed synchronously or asynchronously along with replies thereto.

Moreover, if a synchronous reply to the structured document content is not expected, an End Brackets indicator is set in a last of the request units containing a 3270 data stream structured field with the structured document content embedded therein. The request unit may include a plurality of chained request units, with the structured document content embedded therein. Thus, asynchronous communications may be provided.

Structured document content may also be passed from the second application in an SLU to a first application in a PLU by sending structured document content from the second application to the corresponding SLU and waiting until a 3270 communication session between the PLU and the SLU is Between Brackets, or is In Brackets and the SLU has permission to send. A chain indicating Change Direction in its Request Header is sent from the SLU to the PLU, this chain containing a 3270 data stream structured field with at least some of the structured document content embedded therein. If the chain does not contain all of the structured document content embedded therein, a Change Direction request header is sent from the PLU to the SLU and a chain from the SLU to the PLU indicating Change Direction in its Request Header followed by a chain from the PLU granting permission to send are repeatedly sent until all the embedded structured document content has been sent from the SLU to the PLU. The embedded structured document content is sent from the PLU to the first application after all the embedded structured document content has been sent from the SLU to the PLU.

If a synchronous reply to the embedded structured document content is expected, then a reply may be sent from the first application to the PLU. An End Brackets chain is sent from the PLU to the SLU. At least one request unit is sent from the PLU to the SLU, wherein each request unit contains a 3270 data stream structured field with the reply embedded therein. The embedded reply is sent from the SLU to the corresponding second application. Accordingly, structured document content may be passed from the second application to the first application with replies thereto being synchronously or asynchronously returned.

The present invention will now be described with reference to the following drawings, in which like reference numbers denote the same element throughout.

BRIEF DESCRIPTION OF THE DRAWINGS

FIGS. 4A and 4B depict synchronous communications and asynchronous communications, respectively, according to the present invention;

DETAILED DESCRIPTION OF THE PREFERRED EMBODIMENT

The present invention defines a technique for communicating between a PLU and an SLU that communicate with each other over a network using 3270 data stream architecture, by sending 3270 data stream communications between the PLU and the SLU over the network using 3270 data stream architecture and sending 3270 data stream structured fields including structured document content embedded therein. The sending of 3270 data stream communications and the sending of 3270 data stream structured fields may be repeated in an arbitrary sequence, to thereby asynchronously send 3270 data streams and structured document content between the PLU and the SLU over the network using 3270 data stream architecture. Structured fields are well known elements of the 3270 data stream architecture that are used to send and receive additional control functions and data. The use of 3270 data stream structured fields to embed structured document content is described in the above cross-referenced related application.

Figure 1:
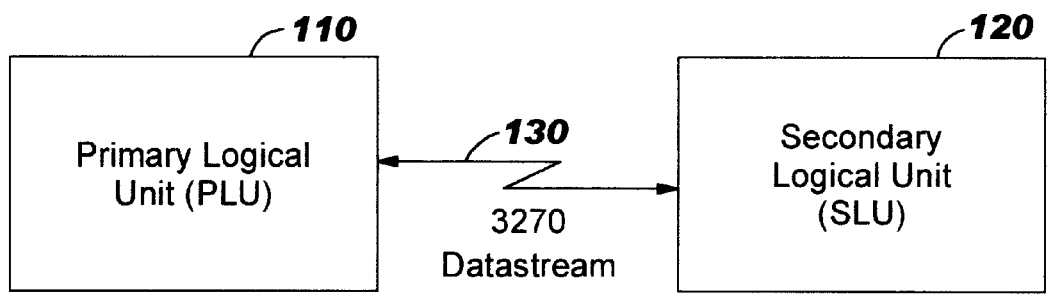
FIG. 1 is a simplified block diagram of a conventional data processing system using 3270 data stream communication.
Figure 2:
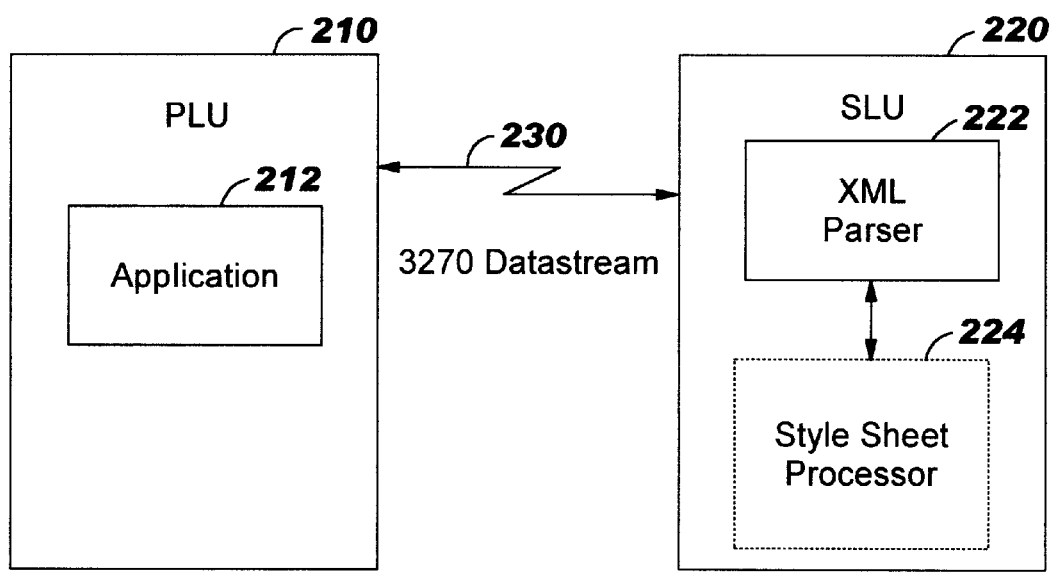
FIG. 2 is a simplified block diagram of a data processing system according to the present invention.

Referring now to FIG. 2, a data processing system 200 includes a PLU 210 and a SLU 220 that communicate with each other over a network 230 using the 3270 data stream. The PLU also includes an application 212 and the SLU 220 includes an application 222, such as an XML parser or other content processor. The SLU 220 may further comprise additional components such as style sheet processor 224. The PLU 210 may also be referred to as a host or server, and the SLU 220 may be referred to as a terminal, workstation, emulator, or client. It will be understood that, although FIG. 2 illustrates a simple data processing system 200 including one PLU, one SLU 220, and a simple network connection 230, the 3270 data stream architecture is generally used to communicate among many PLUs and SLUs using complex network environments. An example of a more typical data processing system using 3270 data stream architecture may be found in U.S. Pat. No. 5,649,101, entitled "System and Method for Improving 3270 Data Stream Performance by Reducing Transmission Traffic", the disclosure of which is hereby incorporated herein by reference.

As will also be appreciated by one of skill in the art, the present invention may be embodied as methods, systems (apparatus), or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Communications whereby the host application sends structured data content to the SLU may occur in either an unsolicited manner, or in response to a document request from the SLU. Furthermore, the SLU may send structured data content to the PLU in either an unsolicited manner or in response to a request from the PLU.

U.S. Pat. No. 6,480,895, titled "Integration of Objects Including Java Bytecodes With Legacy 3270 Applications", defines a technique for integrating Java bytecodes and objects to be used with Java applets in a 3270 data stream. U.S. Pat. No. 6,327,624, titled "Communication of Objects Including Java Bytecodes Between Logical Units Including Java Virtual Machines", defines a technique for transmitting Java bytecodes and objects to be used with Java applets between logical units using a 3270 data stream. However, neither of these patents addresses embedding or transmitting structured document content.

In the preferred embodiment of the present invention, the structured document content that is transmitted in a 3270 data stream structured field may be encoded in a number of alternative markup languages. Alternatively, an implementation of the present invention may support only a single markup language, such as XML, without deviating from the inventive concepts disclosed herein.

A preferred embodiment of the present invention is illustrated in detail in FIGS. 4C through 7, which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as was described in FIGS. 4C through 7, or by combinations of special purpose hardware and computer instructions.

Figure 3A:
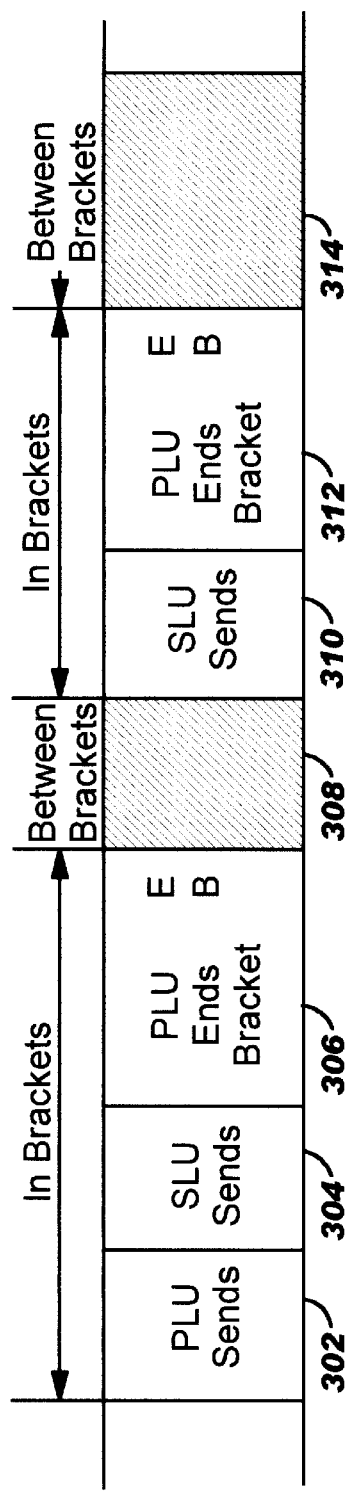
FIGS. 3A and 3B depict a sequence of conventional 3270 data stream communications between a PLU and an SLU.
Figure 3B:
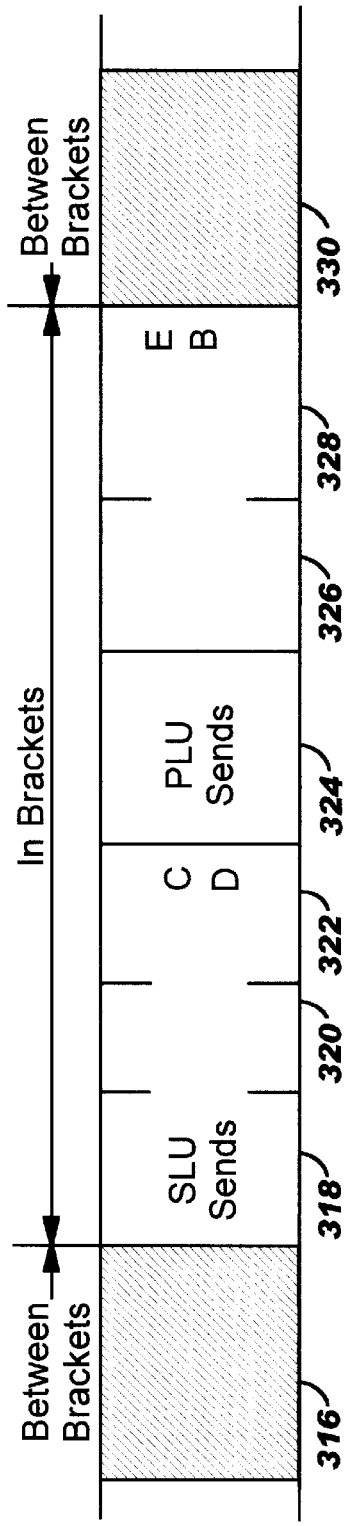

FIGS. 3A and 3B depict a sequence of conventional 3270 data stream interactions between a PLU and an SLU. It will be noted that the PLU and the SLU take turns sending, using a halfduplex flip-flop protocol in which permission to send is conferred by passing a token known as the "Change Direction" (CD) indicator. Either the PLU, shown at 302, or the SLU, shown at 310 and 318, can begin a sequence of communications known as a bracket. However, only the PLU can end a bracket, as shown in 306, 312, and 328. During time intervals 302–306, 310–312, and 318–328, the session is "in brackets". While in brackets, permission to send is governed by the Change Direction indicator. At other times when neither LU is sending (308, 314, 316 and 330), the session is "between brackets". An LU may send just a single RU, such as in 302, 304, 306, 310, and 312. Alternatively, an LU may send a chain of RUs, such as the SLU's chain 318–322, and the PLU's chain 324–328. These concepts are well known to one skilled in the art.

The preferred embodiment of the present invention will now be described with reference to FIGS. 4 through 12.

FIG. 4A depicts an example of synchronous communications wherein a complete structured document is transmitted during a single bracket. In this example, a request 402 for the document is sent from the SLU to the PLU. The PLU responds by sending 404 the requested document. Reference number 406 indicates the session is between brackets. The communication is said to be synchronous because the requesting LU (in the example, the SLU) pauses program execution while waiting for the reply from the second LU. In this manner various applications can communicate structured document content over a 3270 session quasi-concurrently with the use of the session for conventional 3270 interactions between a host application program and an end user (as depicted in the example data flows of FIG. 9).

FIG. 4B depicts asynchronous communications wherein a request 408 for a particular structured document is sent from a first application, co-located with the SLU, is contained within a single bracket ended 410 by the PLU, and is answered by the delivery 414 of the corresponding structured document content from a second application co-located with the PLU, wherein the second message is contained within a different (not necessarily the next sequential) bracket. Reference numbers 412 and 416 indicate the session is between brackets.

As will be explained with reference to FIGS. 5 and 6, LU2 protocol defines certain times when the session state permits the SLU or the PLU to send data to the other. The present invention can identify those times and insert structured document content encoded in 3270 structured fields in a manner that permits quasi-concurrent use of the session by both the conventional host application to end user interaction and a new interaction between applications. (See also FIG. 9, which illustrates sending structured document content interleaved with conventional 3270 data.) For example, either an SLU or a PLU can initiate a synchronous communication such as 402, or an asynchronous communication such as 408 and 410 or 414, whenever the session is between brackets, such as at time 406, 412, and 416, without disturbing the flow of conventional 3270 interactions. An SLU can also initiate an asynchronous communication such as 408 during time intervals 304, 310, or 318 through 322 when the session is in brackets, the SLU has permission to send, and the SLU has not yet sent Change Direction yielding control of the session to the PLU. A PLU can initiate an asynchronous communication such as 414 during time intervals 302, 306, 312, or 324 through 328 when the session is in brackets, the PLU has permission to send, and the PLU has not yet yielded control of the session by sending Change Direction.

Figure 4C:
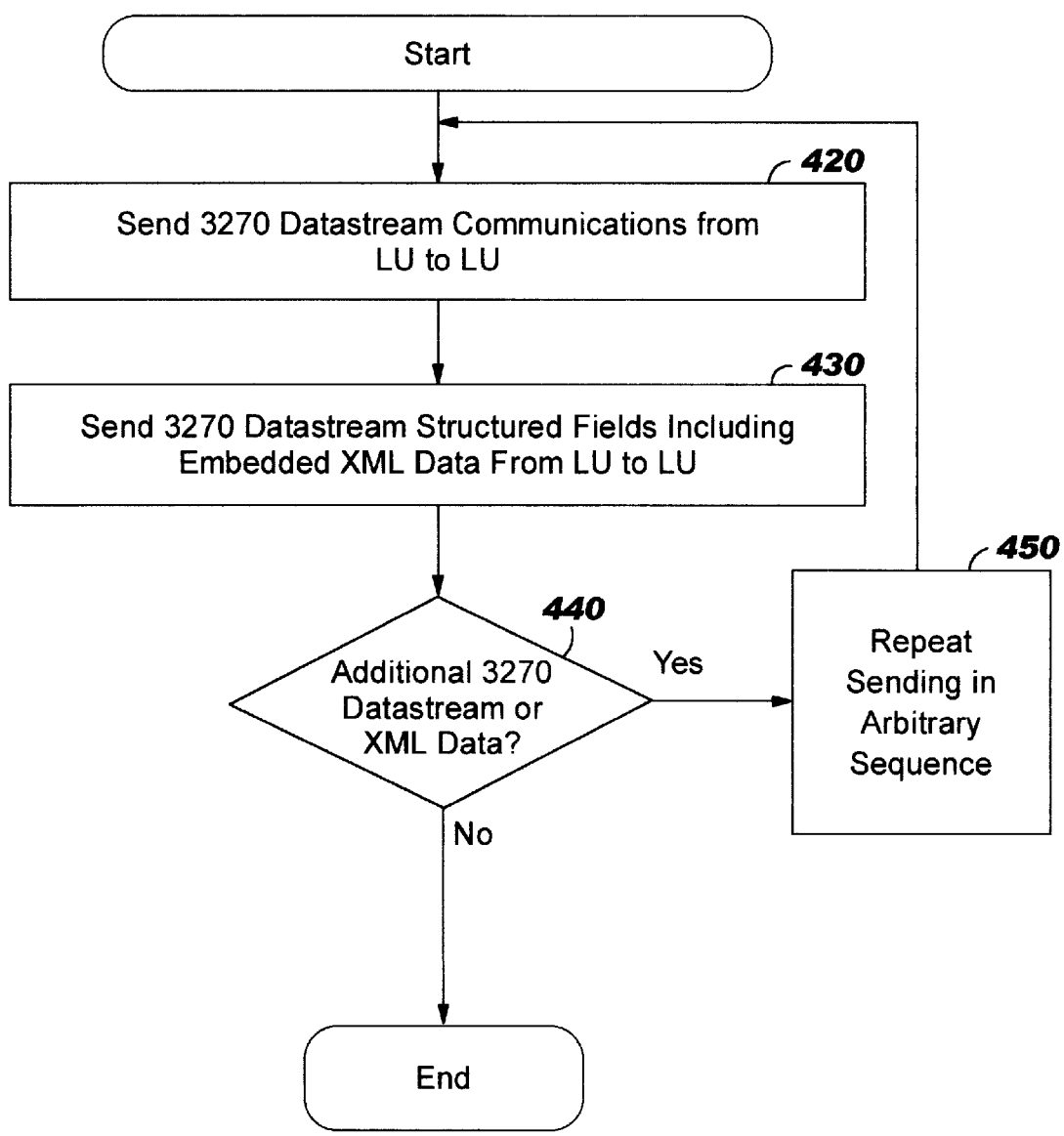
FIG. 4C is a flowchart illustrating generalized communications between Logical Units according to the present invention.

Generalized communications between a PLU and an SLU are described in connection with FIG. 4C. As shown in FIG. 4C, communications take place by sending 3270 data stream communications between the PLU and the SLU over the network using 3270 data stream architecture at Block 420. These are conventional 3270 data stream communications such as were described in FIGS. 3A and 3B. At Block 430, 3270 data stream structured fields including embedded structured document content (such as content encoded using XML, Wireless Binary XML, or other markup languages) are sent between the PLU and the SLU over the network using 3270 data stream architecture. These structured fields may be sent using communications that were described in connection with FIGS. 4A and 4B and that will be described in further detail below.

If additional 3270 data stream communications or structured document communications are desired to be sent at Block 440, then as shown at Block 450, the sending of 3270 data stream communications (Block 420) and the sending of 3270 data stream structured fields including embedded structured document content (Block 430) are repeatedly performed in arbitrary sequence.

Figure 5B:
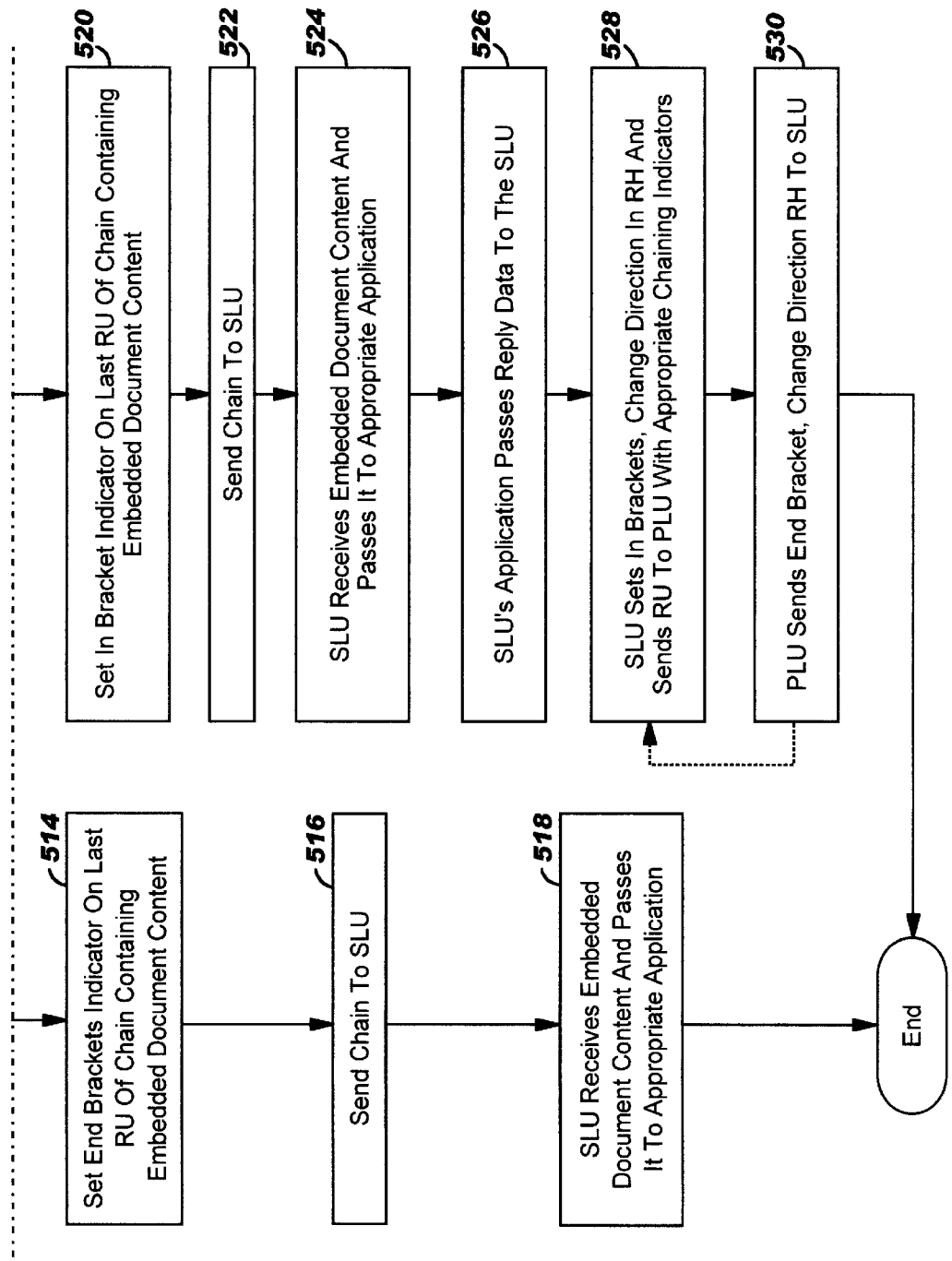
FIG. 5 is a flowchart illustrating PLU-initiated synchronous and asynchronous communications wherein an application, co-located with the PLU, generates and passes data including structured document content, over a 3270 session that is being used quasi-concurrently for legacy 3270 communications, to a peer application co-located with the SLU, and optionally for the SLU's application to send a synchronous reply.

FIG. 5 is a flowchart illustrating overall operations for PLU-initiated synchronous and asynchronous communications according to the present invention. Asynchronous communications support an asynchronous programming model in which an application co-located with the PLU passes structured document content over a 3270 session that is being used quasi-concurrently for legacy 3270 communications, to a peer application co-located with the SLU, without either application having to stop program execution to wait for a reply from the other. This is an efficient programming model that can allow the program to perform other tasks while waiting for the results of communications. Synchronous communications support a synchronous programming model in which the application co-located with the PLU pauses program execution while waiting for the SLU application's reply. The present invention can support both the synchronous and asynchronous programming models, so that modern programs written for other environments, and which process structured document content, can be used within a legacy 3270 environment without modification.

The operations illustrated in FIG. 5 may be invoked when the PLU's application passes structured document content to the PLU in Block 502. The signal from the application to the PLU may include a reply-expected indicator that will be tested in Block 512. In Block 504, the PLU waits until the session is between brackets, or is in brackets and the PLU has permission to send. The PLU then embeds the structured document content in a chain including at least one request/response unit (RU) at Block 506. A request/response unit and all the various indicators contained within its request/reply header (RH) are described in the above-cited IBM manual. Each RU contains at least one 3270 data stream structured field. That structured field may represent at least one structured document (or a segment thereof) embedded therein.

There are a number of events that could give rise to the PLU having permission to send. For example, the PLU could have permission to send by virtue of the Change Direction indicator having been set on the RH of the last RU received from the SLU. Alternatively, the PLU could have been in brackets, in the process of sending legacy 3270 data to the SLU, but had not yet ended the bracket before the co-located application passed it new structured document content to be transmitted. When one of the Block 504 conditions is true, in Block 508 the PLU tests whether the session is in brackets. If not, in Block 510 the PLU sets the Begin Bracket indicator to 1 (otherwise, the Begin Bracket indicator is 0 to indicate "In Brackets") in the RH of the first RU of the chain containing the embedded structured document content. It will be understood by one skilled in the art that the sending of a chain in Block 510 may be repeated arbitrarily using any valid combination of bracket and change direction indicators until all the PLU data has been sent.

If a reply-expected indicator is used, then in Block 512 the PLU tests the reply-expected indicator to determine if it should expect a synchronous reply to the document content it is about to send. If no reply is expected, in Block 514 the PLU sets the End Bracket indicator on the last RU of the chain containing the embedded document content. In Block 516, the PLU sends the chain to the SLU. In Block 518, the SLU receives the embedded structured document content and passes it to the appropriate application (e.g. an XML parser, as depicted in FIG. 2), as set forth in the related application filed concurrently herewith, whereupon the operations of FIG. 5 end.

Alternatively, if in Block 512 the PLU expects a synchronous reply to the structured document content chain, then in Block 520 the PLU leaves the End Bracket indication at zero (indicating "In Brackets") on the last RU of the chain containing the embedded document content and in Block 522 sends the chain to the SLU. In Block 524, the SLU receives the embedded document content and passes it to the appropriate application. In Block 526, the SLU's application creates and passes reply data (if any) to the SLU for transmission back to the peer application co-located with the PLU.

Because of the asymmetry in standard LU2 protocols, the operation for the SLU to send a chained RU to the PLU, shown in Block 528, is different from the PLU's sending operation previously described in Block 510. The SLU creates a chain of at least one RU to send to the PLU, containing at least one 3270 data stream structured field with structured document content therein. In the RH of the chain, along with the appropriate chaining indicators, the SLU sets the Begin Brackets, End Brackets indicators to (0,0), indicating In Brackets, and sets the Change Direction indicator as well.

In Block 530, upon receipt of the message sent by the SLU in 528, the PLU sends an End Bracket, Change Direction RH to the SLU, allowing the SLU to continue sending any additional chain elements, shown by optionally looping back to Block 528. Alternatively, if the chain had only one RU, the operation of FIG. 5 ends, allowing the session to return to a neutral Between Brackets state in which either standard legacy 3270 operations, or the synchronous or asynchronous sending of structured document content inside 3270 data stream structured fields, may occur. It will be understood that since the SLU may discard an entire chain and send a negative response if it wins a bracket contention, the application co-located with the PLU should be prepared to resend any structured data if a transmission is rejected for this reason. To avoid the need for this error recovery logic, the application co-located with the PLU can request permission to begin a bracket using BID. If it receives a positive response, it may begin a bracket with the assurance that it will not be interrupted due to bracket contention.

SLU initiated synchronous and asynchronous communications will now be described with reference to FIG. 6. In Block 605, the SLU's application and/or conventional 3720 Presentation Services (PS) passes data to the SLU. These operations may be performed asynchronously by placing the data on a work queue that the SLU inspects whenever it has an opportunity. The SLU encodes any document content on its work queue into one or more structured fields. Using the 2-bit "Group" field in the structured field header, the SLU marks the first structured field First in Message (FLM), any middle SFs Middle in Message (MIM), and the last SF Last in Message (LIM). The SLU performs conventional 3270 preprocessing on any conventional 3270 data in its work queue. The SLU waits until the session is between brackets (BETB), or in brackets (INB) and the SLU has permission to send.

In Block 610, the SLU checks the length of each work item. If the item is smaller than the maximum RU size, Block 620 is executed next. Otherwise, the SLU converts each overlength item into a chain of Request Units (RUs). In Block 620, the SLU fetches the next chain that is ready to send. In Block 625, the SLU tests whether the session is between brackets (BETB). If so, the SLU next executes Block 635. Otherwise, in Block 630, it sets the Begin Brackets (BB) indicator in the Request Header (RH) of the first element in the chain. In Block 635, it sets the Change Direction (CD) indicator on the last element in the chain and sends. the entire chain to the PLU. It then receives a chain from the PLU granting permission to send. As will be understood by those skilled in the art, this chain granting permission to send may indicate, for example, In Brackets Change Direction or End Brackets Change Direction, and its RU may be null, a structured field message, or conventional 3270 data. In Block 640, the SLU then tests whether it has more to send. If so, it loops back to Block 620. Otherwise, Block 650 in FIG. 6B is then executed.

In Block 650, the PLU passes received structured document content embedded in structured fields to the appropriate PLU application, and any conventional 3270 data to a conventional 3270 data handler. If in Block 655 the structured document content does not call for a synchronous reply, operations end. Otherwise, in Block 660, the PLU application passes reply data to the PLU. The PLU encodes any data exceeding the structured field length limit as multiple SFs; otherwise, it encodes the data in a single SF. Using the 2-bit "group" field in the structured field header, the PLU marks the first SF FIM, any middle ones MIM, and the last one LIM. Before transmitting, the PLU converts any over-length item into a chain of RUs.

In Block 665, the PLU fetches the next chain to send. In Block 670, it tests whether the session is between brackets. If not, it sets Begin Bracket (BB) on the first element of the chain. Otherwise, it proceeds directly to Block 680, where it sets End Bracket on the last element in the chain and sends the chain to the SLU. In Block 685, the PLU tests whether it has more data to send. If so, it loops back to Block 665. In Block 690, the SLU passes structured data from embedded structured fields to the appropriate SLU application, and any conventional 3270 data to 3270 Presentation Services.

The operations from Block 502 through and including Block 518, and from Block 605 through and including Block 650 but excluding Blocks 655 through 690, may both be referred to as "asynchronous communications" because execution of the application program co-located with the LU need not stop and wait for a reply from the other LU, and may take place at any time with reference to a sequence of conventional 3270 data stream interactions, as long as the initial conditions permitting such transmission to begin (Blocks 504 or 605, respectively) are satisfied. Either of these asynchronous communications procedures could be used to transmit a "request", a "reply", or merely data, from an application to its peer co-located at the other LU.

Figure 6A:
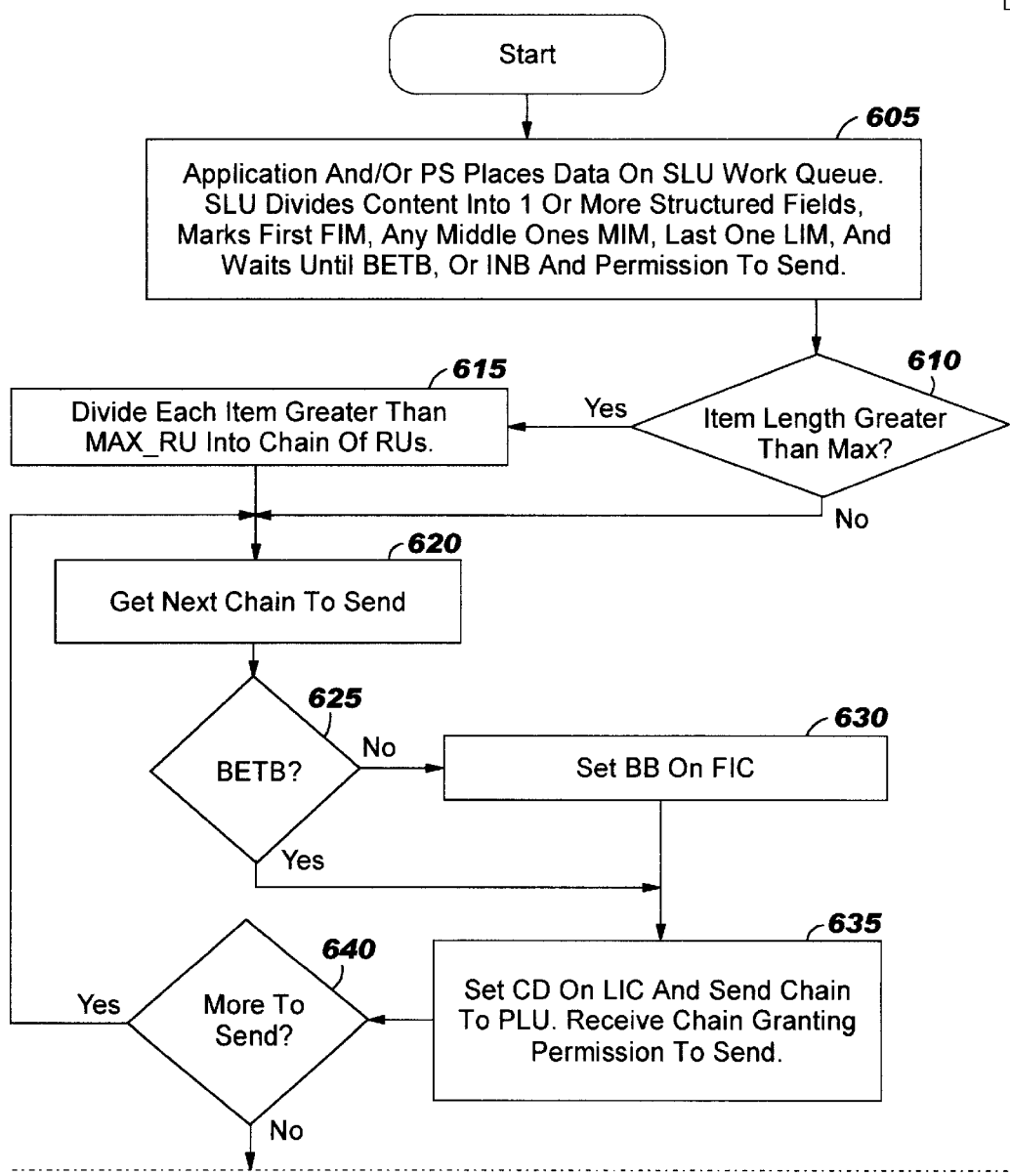
FIG. 6 is a flowchart illustrating SLU-initiated synchronous and asynchronous communications wherein an application, co-located with the SLU, passes data including structured document content over a 3270 session that is being used quasi-concurrently for legacy 3270 communications to a peer application co-located with the PLU, and optionally for the PLU's application to send a synchronous reply.
Figure 6B:
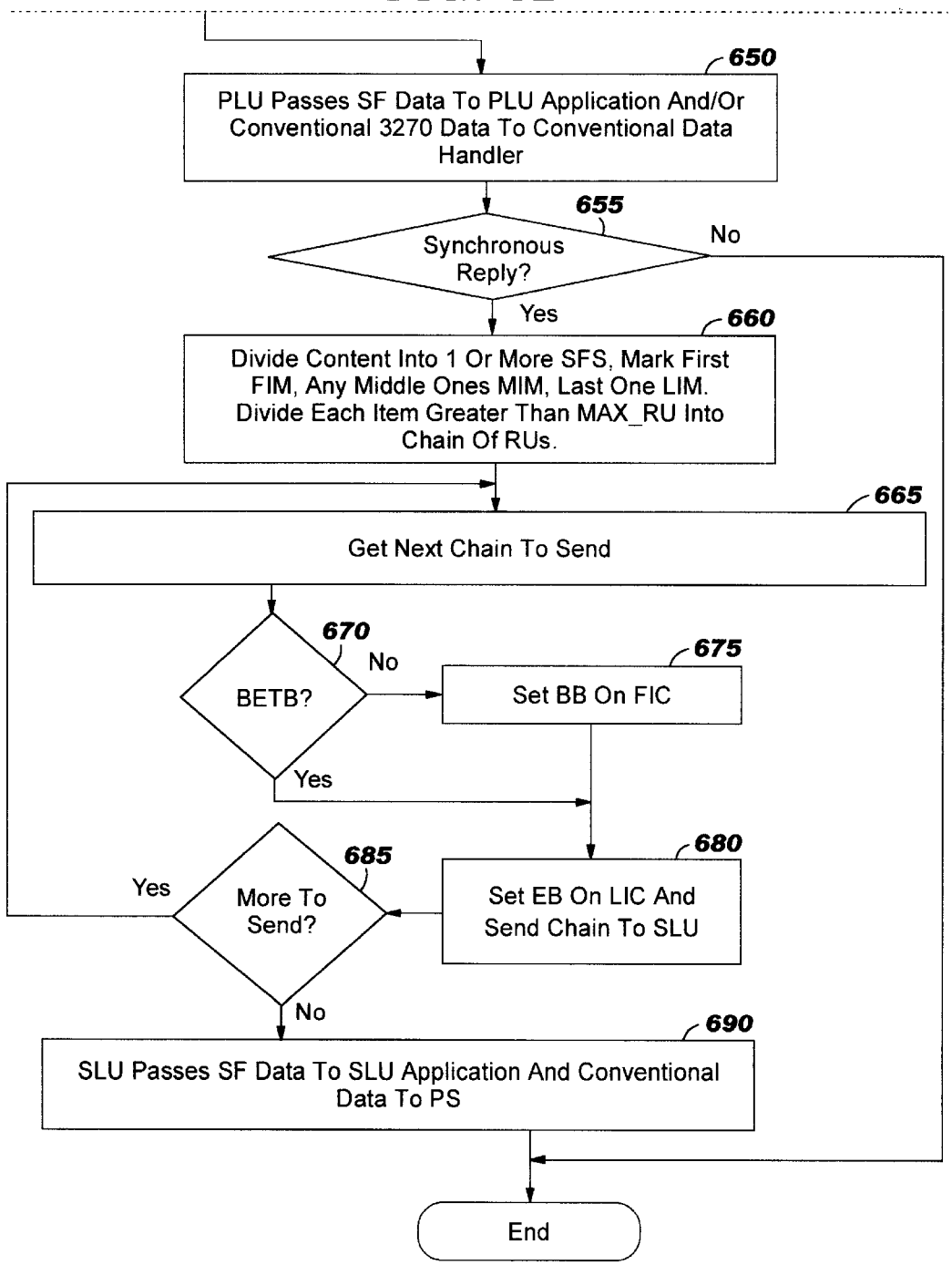
Figure 8:
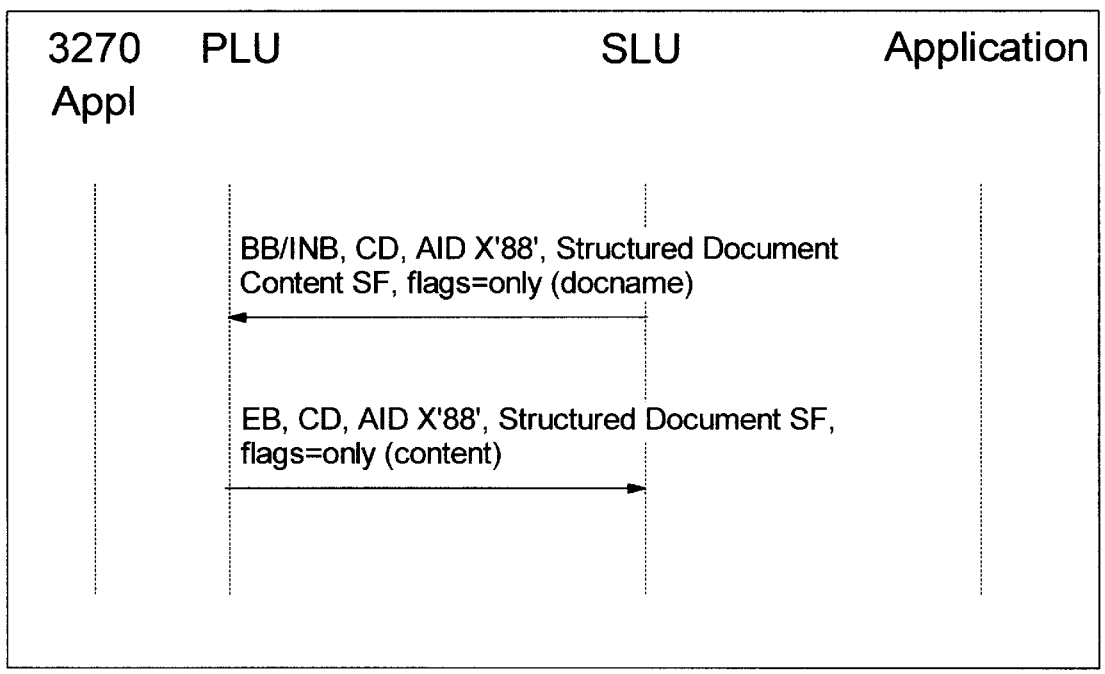
FIGS. 8 through 12 illustrate specific examples of communication flows that integrate structured document content with legacy 3270 applications according to the present invention.
Figure 9:
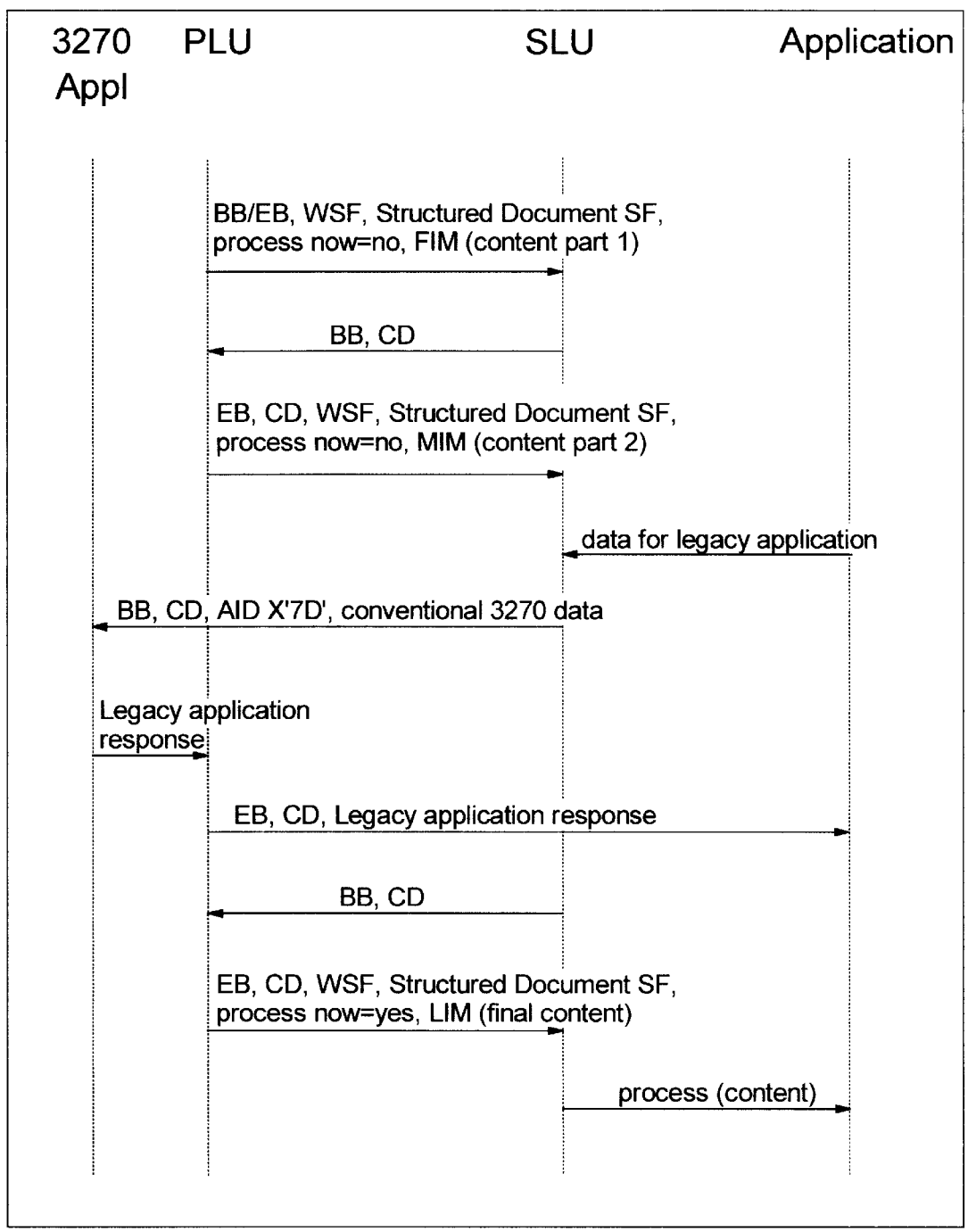
Figure 10:
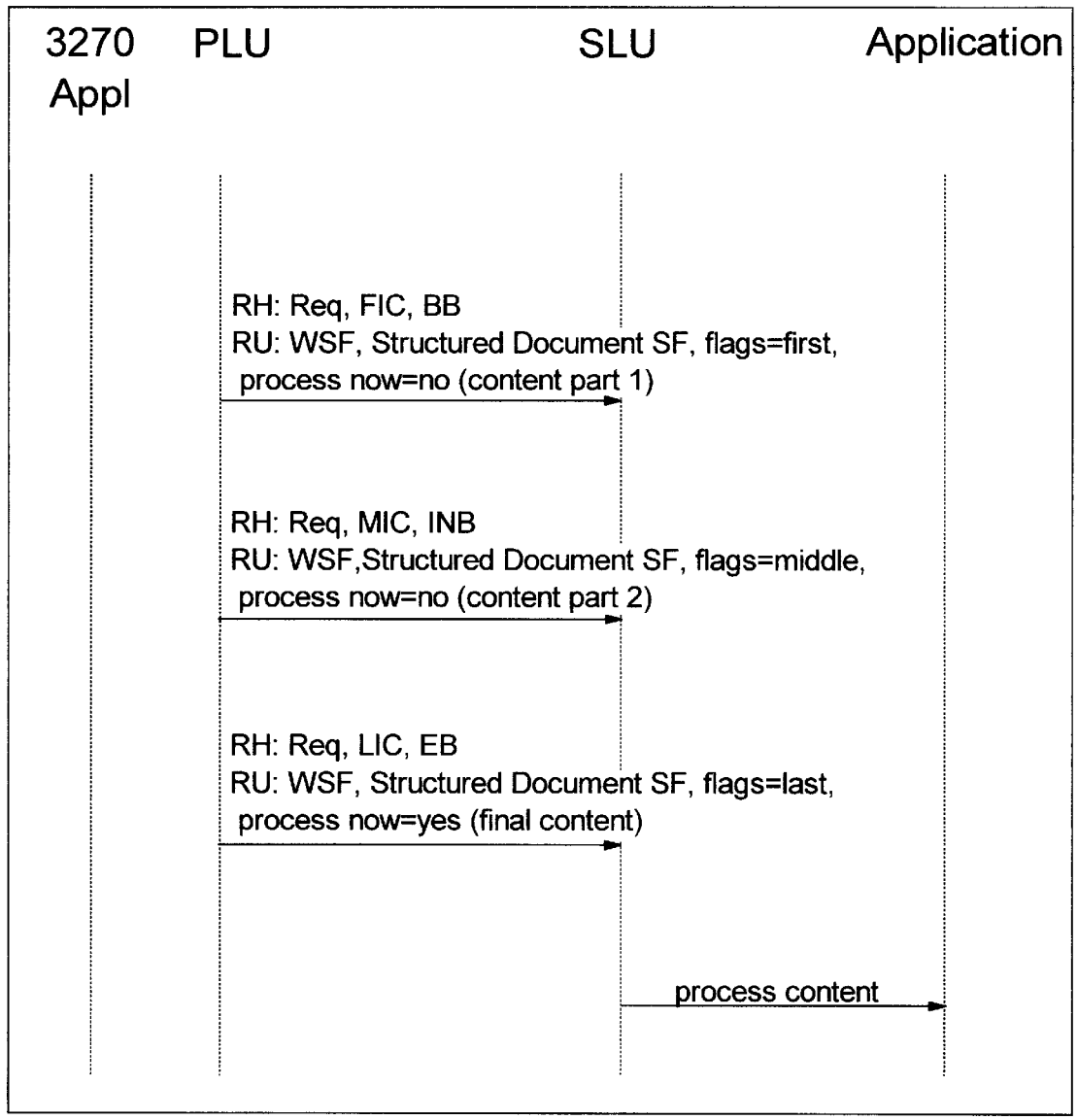

FIG. 8 illustrates synchronous communication flows using LU2 protocol from the SLU to the PLU, as was described generally in FIG. 6. FIG. 10 illustrates synchronous communication flows from the PLU (host) to the SLU (emulator), as was generally described in FIG. 5.

It will be understood that the structured document content sent in structured fields can be a request for a document and the reply can be the document itself. This request is generally initiated by the SLU, where the application co-located at the SLU is a document consumer and the application co-located at the PLU is a document producer. An example flow is illustrated in FIGS. 8 and 11.

Figure 11:
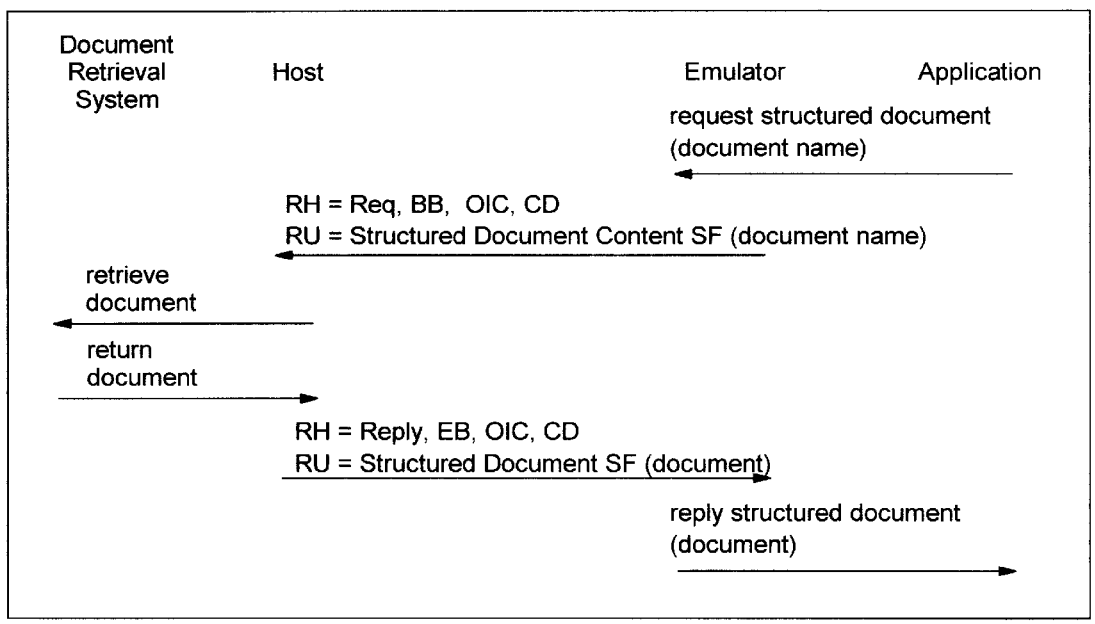
Figure 12:
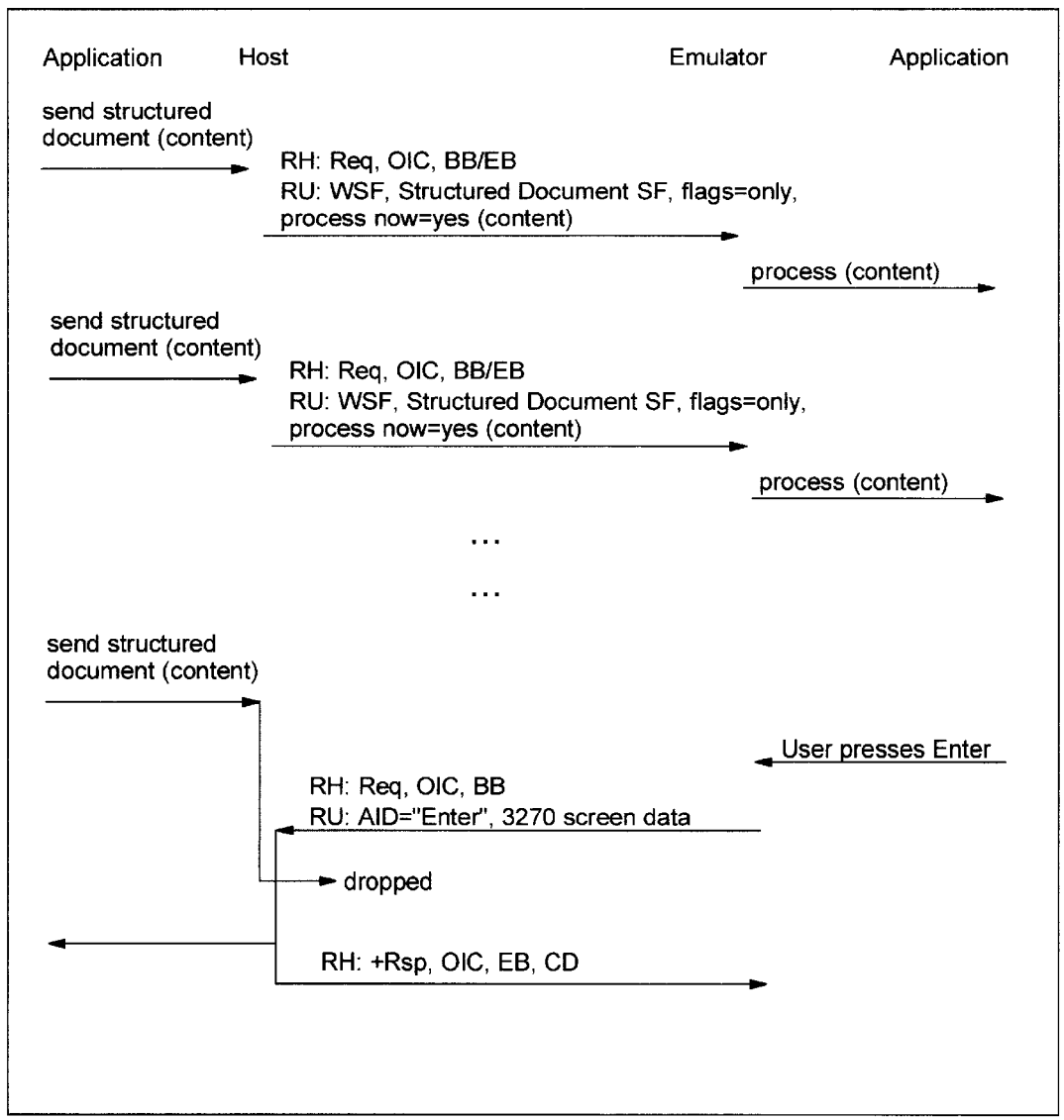

FIG. 11 illustrates synchronous communication flows of FIG. 8 (using the logic described above with reference to FIG. 6) initiated by the SLU (referred to as an emulator). FIG. 12 illustrates asynchronous communication flows (using the logic described above with reference to FIG. 5), where the asynchronous communications are initiated by the PLU.

The technique of the present invention which enables delayed processing of structured document content (delivered from an application co-located with a PLU to an application co-located with an SLU over a network using 3270 data stream architecture) will now be described in connection with FIG. 7. As is known in the art, there are generally long pauses between data inputs by a user of a conventional 3270 application during which data transmission is idle. The present invention can take advantage of those pauses by interleaving structured document content with other transmissions on the session, such as character-formatted data sent by the legacy application. A "Process Now" indicator may be included in structured document content transmission, which can either be turned on or off. This allows a well-designed application to start sending structured document content in anticipation of the data being needed. Using this indicator, the sender is able to take advantage of lulls in the transmission to send structured documents in chunks while still being able to notify the receiver if (and when) it has received a document that is complete and processable by a document processor. (Otherwise, a document processor such as a parser is likely to generate an error condition it if begins processing a structured document which has been only partially received.) See also FIGS. 9 and 10. When the complete document has been transmitted, and thus can be safely processed by a document processor, a message is sent referencing the previously-sent document with the "Process Now" indicator turned on.

Figure 7:
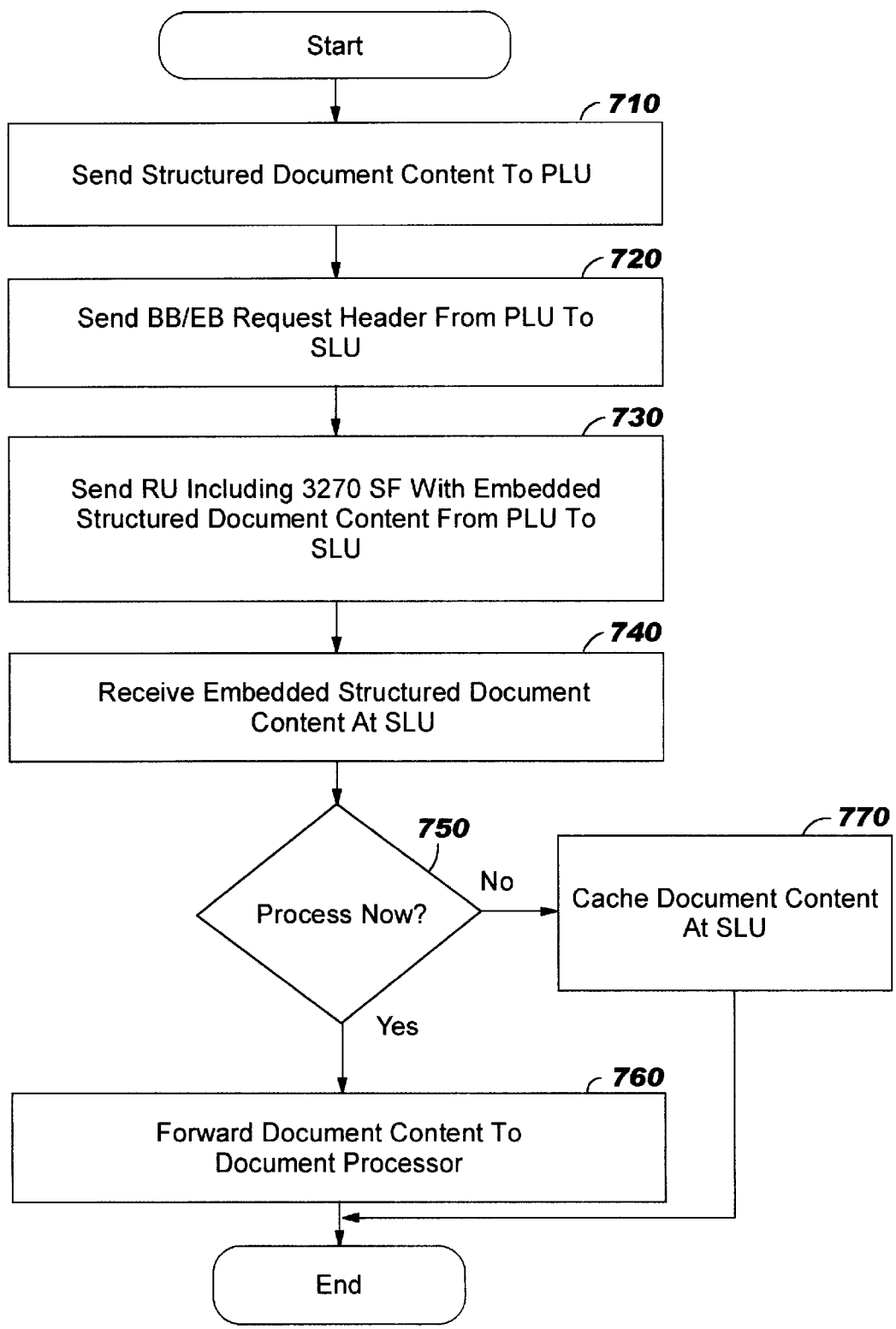
FIG. 7 is a flowchart illustrating a technique that enables delayed processing of structured document content according to the present invention.

As depicted in FIG. 7, structured document content is sent from, for example, a document server or other data retrieval system to the PLU at Block 710. A Begin Bracket/End Bracket (BB/EB) request header is sent from the PLU to the SLU at Block 720. At Block 730, a single request unit (RU) including a 3270 data stream structured field with structured document content embedded therein is sent from the PLU to the SLU. Then, at Block 740, the embedded structured document content is received at the SLU. Those skilled in the art will understand that the operations indicated by Blocks 720 and 730 are generally combined in a single transmission. The 3270 data stream structured field preferably includes a "Process Now" indicator which may be used to control whether the content is immediately processed or is cached for later processing. Block 750 checks to see if the "Process Now" indicator is set to "Yes". If so, then at Block 760, the structured document content is forwarded to the appropriate application (such as a content renderer) for processing (for example, using a content type identifier to access a table of document processors, as described in more detail in the above cross-referenced related application). If not, then Block 770 caches the structured document content at the SLU for later processing.

FIG. 12 depicts use of this technique whereby the PLU sends a stream of individual structured document structured fields with the "Process Now" indicator set to "Yes". Normally, during a transmission of this type a half-duplex flip-flop protocol would not enable a receiving party to interrupt transmission. However, it may be desirable in particular applications to enable a user to interrupt the PLU sending a stream of structured documents for immediate processing. The present invention provides a mechanism for this purpose, which is illustrated in FIG. 12. Each structured document is sent in its own RU with Begin Bracket, End Bracket, flags=only in segment, and Process Now=Yes, with no response requested indicators set. Between such structured document transmissions, the session is preferably between brackets, permitting interruption by the legacy 3270 user. Accordingly, multiple structured documents which are to be immediately processed can be communicated between 3270 logical units using 3270 data stream architecture.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. A method for passing structured document content from a first application in a Primary Logical Unit (PLU) to a second application in a Secondary Logical Unit (SLU) that communicate with each other over a network using 3270 data stream architecture, the method comprising the steps of:

sending structured document content from the first application to the corresponding PLU;

waiting until a 3270 communications session between the PLU and the SLU is between brackets, or is in brackets and the PLU has permission to send;

if the session is between brackets, sending a Begin Brackets request header from the PLU to the SLU;

sending at least one request unit from the PLU to the SLU, the at least one request unit containing a 3270 data stream structured field with the structured document content embedded therein; and sending the embedded structured document content from the SLU to the second application.

2. The method according to claim 1:

wherein the step of sending at least one request unit from the PLU to the SLU comprises the step of setting an In Brackets indicator in a last of the at least one request units containing a 3270 data stream structured field with the structured document content embedded therein, if a synchronous reply to the structured document content is expected; and wherein the step of sending the embedded structured document content from the SLU to the second application is followed by the steps of:

sending a reply from the second application to the SLU;

sending an In Brackets, Change Direction request header from the SLU to the PLU;

sending at least one request unit from the SLU to the PLU, the at least one request unit containing a 3270 data stream structured field with the reply embedded therein; and sending the embedded reply from the PLU to the corresponding first application.

3. The method according to claim 2, wherein the step of sending at least one request unit from the SLU to the PLU, the at least one request unit containing a 3270 data stream structured field with the reply embedded therein, is followed by the step of:

sending an End Brackets, Change Direction request header from the PLU to the SLU.

4. The method according to claim 2, wherein the structured document content is a request for a structured document and wherein the reply is the requested document.

5. The method according to claim 1:

wherein the step of sending at least one request unit from the PLU to the SLU comprises the step of setting an End Brackets indicator in a last of the at least one request units containing a 3270 data stream structured field with the structured document content embedded therein, if a synchronous reply to the structured document content is not expected.

6. The method according to claim 1, wherein the step of sending at least one request unit from the PLU to the SLU comprises the step of:

sequentially sending a plurality of chained request units from the PLU to the SLU, the plurality of chained request units containing the 3270 data stream structured field with the structured document content embedded therein.

7. A method for passing structured document content from a second application in a Secondary Logical Unit (SLU) to a first application in a Primary Logical Unit (PLU) that communicate with each other over a network using 3270 data stream architecture, the method comprising the steps of:

sending structured document content from the second application to the corresponding SLU;

waiting until a 3270 communications session between the PLU and the SLU is in brackets and the SLU has permission to send;

sending a Begin Brackets, Change Direction request header from the SLU to the PLU;

sending a chain from the SLU to the PLU, the chain containing a 3270 data stream structured field with at least some of the structured document content embedded therein;

if the chain does not contain all of the structured document content embedded therein, sending a Change Direction request header from the PLU to the SLU;

if the chain does not contain all of the structured document content embedded therein, repeating the step of sending a Change Direction request header and the step of sending a chain from the SLU to the PLU, until all the embedded structured document content has been sent from the SLU to the PLU; and sending the embedded structured document content from the PLU to the first application after all the embedded structured document content have been sent from the SLU to the PLU.

8. The method according to claim 7, wherein the step of sending the embedded structured document content from the PLU to the first application after all the embedded structured document content has been sent from the SLU to the PLU, is followed by the following steps if a synchronous reply to the embedded structured document content is expected:

sending a reply from the first application to the PLU;

sending an End Brackets chain from the PLU to the SLU;

sending at least one chain from the PLU to the SLU, the at least one chain containing a 3270 data stream structured field with the reply embedded therein; and sending the embedded reply from the SLU to the corresponding second application.

9. The method according to claim 7, wherein the structured document content is a request for a structured document and wherein the reply is the requested document.

10. A method for passing structured document content from a document producer in a Primary Logical Unit (PLU) to a document consumer in a Secondary Logical Unit (SLU) that communicate with each other over a network using 3270 data stream architecture, the method comprising the steps of:

sending structured document content from the document producer to the PLU;

sending a Begin Brackets/End Brackets request header from the PLU to the SLU over the network using a 3270 communications session;

sending a single request unit from the PLU to the SLU using the 3270 communications session, the single request unit containing a 3270 data stream structured field with the structured document content embedded therein;

sending the embedded structured document content from the SLU to the document consumer; and processing the structured document content by the document consumer.

11. The method according to claim 10, wherein the following steps are performed between the steps of sending structured document content from the document producer to the PLU, and sending a Begin Brackets/End Brackets request header from the PLU to the SLU:

sending a request header from the SLU to the PLU; and sending a request unit from the SLU to the PLU, the request unit containing a 3270 data stream therein.

12. A method for communicating between a Primary Logical Unit (PLU) and a Secondary Logical Unit (SLU) that communicate with each other over a network using 3270 data stream architecture, the method comprising the steps of:

sending 3270 data stream communications between a first legacy application co-located with the PLU and a second legacy application co-located with the SLU over the network using 3270 data stream architecture;

sending 3270 data stream structured fields including embedded structured document content between a first structured document application co-located with the PLU and a second structured document application co-located with the SLU over the network using 3270 data stream architecture; and repeatedly performing the step of sending 3270 data stream communications and the step of sending 3270 data stream structured fields, in an arbitrary sequence, to thereby send 3270 data streams and structured document content between the first and second legacy applications and the first and second structured document applications over the network using 3270 data stream architecture.

13. The method according to claim 12, wherein the structured document content is encoded in an Extensible Markup Language (XML) notation.

14. A system for passing structured document content from a first application in a Primary Logical Unit (PLU) to a second application in a Secondary Logical Unit (SLU) that communicate with each other over a network using 3270 data stream architecture, the system comprising:

means for sending structured document content from the first application to the corresponding PLU;

means for waiting until a 3270 communications session between the PLU and the SLU is between brackets, or is in brackets and the PLU has permission to send;

if the session is between brackets, means for sending a Begin Brackets request header from the PLU to the SLU;

means for sending at least one request unit from the PLU to the SLU, the at least one request unit containing a 3270 data stream structured field with the structured document content embedded therein; and means for sending the embedded structured document content from the SLU to the second application.

15. The system according to claim 14:

wherein the means for sending at least one request unit from the PLU to the SLU comprises means for setting an In Brackets indicator in a last of the at least one request units containing a 3270 data stream structured field with the structured document content embedded therein, if a synchronous reply to the structured document content is expected; and wherein execution of the means for sending the embedded structured document content from the SLU to the second application is followed by:

means for sending a reply from the second application to the SLU;

means for sending an In Brackets, Change Direction request header from the SLU to the PLU;

means for sending at least one request unit from the SLU to the PLU, the at least one request unit containing a 3270 data stream structured field with the reply embedded therein; and means for sending the embedded reply from the PLU to the corresponding first application.

16. The system according to claim 15, wherein execution of the means for sending at least one request unit from the SLU to the PLU, the at least one request unit containing a 3270 data stream structured field with the reply embedded therein, is followed by:

means for sending an End Brackets, Change Direction request header from the PLU to the SLU.

17. The system according to claim 15, wherein the structured document content is a request for a structured document and wherein the reply is the requested document.

18. The system according to claim 14:

wherein the means for sending at least one request unit from the PLU to the SLU comprises means for setting an End Brackets indicator in a last of the at least one request units containing a 3270 data stream structured field with the structured document content embedded therein, if a synchronous reply to the structured document content is not expected.

19. The system according to claim 14, wherein the means for sending at least one request unit from the PLU to the SLU comprises:

means for sequentially sending a plurality of chained request units from the PLU to the SLU, the plurality of chained request units containing the 3270 data stream structured field with the structured document content embedded therein.

20. A system for passing structured document content from a second application in a Secondary Logical Unit (SLU) to a first application in a Primary Logical Unit (PLU) that communicate with each other over a network using 3270 data stream architecture, the system comprising:

means for sending structured document content from the second application to the corresponding SLU;

means for waiting until a 3270 communications session between the PLU and the SLU is in brackets and the SLU has permission to send;

means for sending a Begin Brackets, Change Direction request header from the SLU to the PLU;

means for sending a chain from the SLU to the PLU, the chain containing a 3270 data stream structured field with at least some of the structured document content embedded therein;

if the chain does not contain all of the structured document content embedded therein, means for sending a Change Direction request header from the PLU to the SLU;

if the chain does not contain all of the structured document content embedded therein, means for repeating the means for sending a Change Direction request header and the means for sending a chain from the SLU to the PLU, until all the embedded structured document content has been sent from the SLU to the PLU; and means for sending the embedded structured document content from the PLU to the first application after all the embedded structured document content have been sent from the SLU to the PLU.

21. The system according to claim 20, wherein, if a synchronous reply to the embedded structured document content is expected, execution of the means for sending the embedded structured document content from the PLU to the first application after all the embedded structured document content has been sent from the SLU to the PLU, is followed by:

means for sending a reply from the first application to the PLU;

means for sending an End Brackets chain from the PLU to the SLU;

means for sending at least one chain from the PLU to the SLU, the at least one chain containing a 3270 data stream structured field with the reply embedded therein; and means for sending the embedded reply from the SLU to the corresponding second application.

22. The system according to claim 20, wherein the structured document content is a request for a structured document and wherein the reply is the requested document.

23. A system for passing structured document content from a document producer in a Primary Logical Unit (PLU) to a document consumer in a Secondary Logical Unit (SLU) that communicate with each other over a network using 3270 data stream architecture, the system comprising:

means for sending structured document content from the document producer to the PLU;

means for sending a Begin Brackets/End Brackets request header from the PLU to the SLU over the network using a 3270 communications session;

means for sending a single request unit from the PLU to the SLU using the 3270 communications session, the single request unit containing a 3270 data stream structured field with the structured document content embedded therein;

means for sending the embedded structured document content from the SLU to the document consumer; and means for processing the structured document content by the document consumer.

24. The system according to claim 23, wherein execution of the means for sending structured document content from the document producer to the PLU is followed by, and execution of the means for sending a Begin Brackets/End Brackets request header from the PLU to the SLU is preceded by:

means for sending a request header from the SLU to the PLU; and means for sending a request unit from the SLU to the PLU, the request unit containing a 3270 data stream therein.

25. A system for communicating between a Primary Logical Unit (PLU) and a Secondary Logical Unit (SLU) that communicate with each other over a network using 3270 data stream architecture, the system comprising:

means for sending 3270 data stream communications between a first legacy application co-located with the PLU and a second legacy application co-located with the SLU over the network using 3270 data stream architecture;

means for sending 3270 data stream structured fields including embedded structured document content between a first structured document application co-located with the PLU and a second structured document application co-located with the SLU over the network using 3270 data stream architecture; and means for repeatedly performing the means for sending 3270 data stream communications and the means for sending 3270 data stream structured fields, in an arbitrary sequence, to thereby send 3270 data streams and structured document content between the first and second legacy applications and the first and second structured document applications over the network using 3270 data stream architecture.

26. The system according to claim 25, wherein the structured document content is encoded in an Extensible Markup Language (XML) notation.

27. A computer program product for passing structured document content from a first application in a Primary Logical Unit (PLU) to a second application in a Secondary Logical Unit (SLU) that communicate with each other over a network using 3270 data stream architecture, the computer program product embodied on a computer-readable medium and comprising:

computer-readable program code means for sending structured document content from the first application to the corresponding PLU;

computer-readable program code means for waiting until a 3270 communications session between the PLU and the SLU is between brackets, or is in brackets and the PLU has permission to send;

if the session is between brackets, computer-readable program code means for sending a Begin Brackets request header from the PLU to the SLU;

computer-readable program code means for sending at least one request unit from the PLU to the SLU, the at least one request unit containing a 3270 data stream structured field with the structured document content embedded therein; and computer-readable program code means for sending the embedded structured document content from the SLU to the second application.

28. The computer program product according to claim 27:

wherein the computer-readable program code means for sending at least one request unit from the PLU to the SLU comprises computer-readable program code means for setting an In Brackets indicator in a last of the at least one request units containing a 3270 data stream structured field with the structured document content embedded therein, if a synchronous reply to the structured document content is expected; and wherein execution of the computer-readable program code means for sending the embedded structured document content from the SLU to the second application is followed by:

computer-readable program code means for sending a reply from the second application to the SLU;

computer-readable program code means for sending an In Brackets, Change Direction request header from the SLU to the PLU;

computer-readable program code means for sending at least one request unit from the SLU to the PLU, the at least one request unit containing a 3270 data stream structured field with the reply embedded therein; and computer-readable program code means for sending the embedded reply from the PLU to the corresponding first application.

29. The computer program product according to claim 28, wherein execution of the computer-readable program code means for sending at least one request unit from the SLU to the PLU, the at least one request unit containing a 3270 data stream structured field with the reply embedded therein, is followed by:

computer-readable program code means for sending an End Brackets, Change Direction request header from the PLU to the SLU.

30. The computer program product according to claim 28, wherein the structured document content is a request for a structured document and wherein the reply is the requested document.

31. The computer program product according to claim 27:

wherein the computer-readable program code means for sending at least one request unit from the PLU to the SLU comprises computer-readable program code means for setting an End Brackets indicator in a last of the at least one request units containing a 3270 data stream structured field with the structured document content embedded therein, if a synchronous reply to the structured document content is not expected.

32. The computer program product according to claim 27, wherein the computer-readable program code means for sending at least one request unit from the PLU to the SLU comprises:

computer-readable program code means for sequentially sending a plurality of chained request units from the PLU to the SLU, the plurality of chained request units containing the 3270 data stream structured field with the structured document content embedded therein.

33. A computer program product for passing structured document content from a second application in a Secondary Logical Unit (SLU) to a first application in a Primary Logical Unit (PLU) that communicate with each other over a network using 3270 data stream architecture, the computer program product embodied on a computer-readable medium and comprising:

computer-readable program code means for sending structured document content from the second application to the corresponding SLU;

computer-readable program code means for waiting until a 3270 communications session between the PLU and the SLU is in brackets and the SLU has permission to send;

computer-readable program code means for sending a Begin Brackets, Change Direction request header from the SLU to the PLU;

computer-readable program code means for sending a chain from the SLU to the PLU, the chain containing a 3270 data stream structured field with at least some of the structured document content embedded therein;

if the chain does not contain all of the structured document content embedded therein, computer-readable program code means for sending a Change Direction request header from the PLU to the SLU;

if the chain does not contain all of the structured document content embedded therein, computer-readable program code means for repeating the computer-readable program code means for sending a Change Direction request header and the computer-readable program code means for sending a chain from the SLU to the PLU, until all the embedded structured document content has been sent from the SLU to the PLU; and computer-readable program code means for sending the embedded structured document content from the PLU to the first application after all the embedded structured document content have been sent from the SLU to the PLU.

34. The computer program product according to claim 33, wherein, if a synchronous reply to the embedded structured document content is expected, execution of the computer-readable program code means for sending the embedded structured document content from the PLU to the first application after all the embedded structured document content has been sent from the SLU to the PLU, is followed by:

computer-readable program code means for sending a reply from the first application to the PLU;

computer-readable program code means for sending an End Brackets chain from the PLU to the SLU;

computer-readable program code means for sending at least one chain from the PLU to the SLU, the at least one chain containing a 3270 data stream structured field with the reply embedded therein; and computer-readable program code means for sending the embedded reply from the SLU to the corresponding second application.

35. The computer program product according to claim 33, wherein the structured document content is a request for a structured document and wherein the reply is the requested document.

36. A computer program product for passing structured document content from a document producer in a Primary Logical Unit (PLU) to a document consumer in a Secondary Logical Unit (SLU) that communicate with each other over a network using 3270 data stream architecture, the computer program product embodied on a computer-readable medium and comprising:

computer-readable program code means for sending structured document content from the document producer to the PLU;

computer-readable program code means for sending a Begin Brackets/End Brackets request header from the PLU to the SLU over the network using a 3270 communications session;

computer-readable program code means for sending a single request unit from the PLU to the SLU using the 3270 communications session, the single request unit containing a 3270 data stream structured field with the structured document content embedded therein;

computer-readable program code means for sending the embedded structured document content from the SLU to the document consumer; and computer-readable program code means for processing the structured document content by the document consumer.

37. The computer program product according to claim 36, wherein execution of the computer-readable program code means for sending structured document content from the document producer to the PLU is followed by, and execution of the computer-readable program code means for sending a Begin Brackets/End Brackets request header from the PLU to the SLU is preceded by:

computer-readable program code means for sending a request header from the SLU to the PLU; and computer-readable program code means for sending a request unit from the SLU to the PLU, the request unit containing a 3270 data stream therein.

38. A computer program product for communicating between a Primary Logical Unit (PLU) and a Secondary Logical Unit (SLU) that communicate with each other over a network using 3270 data stream architecture, the computer program product embodied on a computer-readable medium and comprising:

computer-readable program code means for sending 3270 data stream communications between a first legacy application co-located with the PLU and a second legacy application co-located with the SLU over the network using 3270 data stream architecture;

computer-readable program code means for sending 3270 data stream structured fields including embedded structured document content between a first structured document application co-located with the PLU and a second structured document application co-located with the SLU over the network using 3270 data stream architecture; and computer-readable program code means for repeatedly performing the computer-readable program code means for sending 3270 data stream communications and the computer-readable program code means for sending 3270 data stream structured fields, in an arbitrary sequence, to thereby send 3270 data streams and structured document content between the first and second legacy applications and the first and second structured document applications over the network using 3270 data stream architecture.

39. The computer program product according to claim 38, wherein the structured document content is encoded in an Extensible Markup Language (XML) notation.

\* \* \* \* \*